US007317829B2

(12) United States Patent
Herley

(10) Patent No.: US 7,317,829 B2
(45) Date of Patent: Jan. 8, 2008

(54) BACKGROUND COLOR ESTIMATION FOR SCANNED IMAGES

(75) Inventor: Cormac Herley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 844 days.

(21) Appl. No.: 10/734,516

(22) Filed: Dec. 12, 2003

(65) Prior Publication Data

US 2005/0129310 A1 Jun. 16, 2005

(51) Int. Cl.
*G06K 9/00* (2006.01)
*G06K 9/34* (2006.01)
*H04N 1/387* (2006.01)

(52) U.S. Cl. ...................... 382/171; 382/164; 382/174; 358/453

(58) Field of Classification Search ................ 382/164, 382/171, 174; 358/453
See application file for complete search history.

(56) References Cited

U.S. PATENT DOCUMENTS

| | | | | |
|---|---|---|---|---|
| 5,742,277 | A | 4/1998 | Gossett et al. | |
| 5,901,243 | A * | 5/1999 | Beretta | 382/168 |
| 6,323,957 | B1 * | 11/2001 | Ball | 358/1.9 |
| 7,085,413 | B2 * | 8/2006 | Huang et al. | 382/163 |
| 7,099,042 | B2 * | 8/2006 | Yaguchi | 358/1.9 |
| 2002/0154798 | A1 * | 10/2002 | Cong et al. | 382/128 |

FOREIGN PATENT DOCUMENTS

JP 01082270 A * 3/1989

OTHER PUBLICATIONS

Nishida et al. ("Restoring Color Document Images with Show-Through Effects by Multiscale Analysis," SPIE vol. 5008, Conf. date: Jan. 21, 2003, pp. 70-80).*

Co-pending U.S. Appl. No. 10/354,500, "System and method for automatically detecting and extracting objects in digital image data," filed Jan. 29, 2003.

Francois, A. R., and G. G. Medioni, Adaptive color background modeling for real-time segmentation of video streams, *Proc. of the Int'l Conf. on Imaging Science, Sys., and Tech.*, 1999, pp. 227-232.

Gordon, G., T. Darrell, M. Harville, and J. Woodfill, Background estimation and removal based on range and color, *Proc. of the IEEE Computer Soc'y Conf. on Computer Vision and Pattern Recognition*, Fort Collins, CO, Jun. 1999.

(Continued)

*Primary Examiner*—Daniel Miriam
*Assistant Examiner*—Yubin Hung
(74) *Attorney, Agent, or Firm*—Lyon & Harr, L.L.P.; Craig S. Fischer

(57) ABSTRACT

A background color estimation system and method for estimating a background color of a scanned image. The background color estimation method includes generating a list of candidate background colors present in the image, determining the most common candidate color from the list, and designating the most common candidate background color as the estimated background color. Candidate colors are extracted from the scanned image by examining lines of pixels in the image and generating frequency distributions (such as histograms) of pixel colors within the lines. The frequency value of the most common pixel color in the frequency distribution is compared to a frequency threshold. If the frequency value is greater than the frequency threshold, the most common pixel color is considered a candidate background color. In addition, a variance of the estimated background color is obtained and can be used to intelligently select a threshold for additional image processing techniques.

18 Claims, 8 Drawing Sheets

OTHER PUBLICATIONS

Haenselmann, T., C, Schremmer, W. Effelsberg, Wavelet-based semi-automatic segmentation of image objects, *Proc. Signal and Image Processing* (*SIP 2000*), Las Vegas, USA 2000.

Nishida, H., and T. Suzuki, Correcting show-through effects on document images by multiscale analysis, 16th Int'l Conf. on Pattern Recognition (ICPR'02), vol. 3, pp. 65-68.

Shioyama, T., H. Wu, and S. Mitani, Segmentation and object detection with gabor filters and cumulative histograms, *Proc. of the* $10^{th}$ *Int'l Conf. on Image Analysis and Processing* (*Venice*), 1999, p. 412-417.

* cited by examiner

BACKGROUND COLOR ESTIMATION FOR SCANNED IMAGES

TECHNICAL FIELD

The present invention relates in general to image processing of digital images and more particularly to a background color estimation system and method for estimating a background color of a scanned image.

BACKGROUND OF THE INVENTION

Optical scanners are popular peripheral devices for computers. Optical scanners are used to take objects containing printed information (such as text, illustrations or photographs) and convert the information into a digital form that a computer can use. In general, a user places objects to be scanned onto a platen of the scanner. A scanner head is passed over the platen area and the resultant image is divided into a plurality of pixels. Each pixel location is assigned a value that is dependent on the color of the pixel. The resulting matrix of bits (called a bit map) can then be stored in a file, displayed on a monitor, and manipulated by software applications. The resulting scanned image contains both data pixels, which are pixels that are located on the objects, and background pixels, which are pixels that are the color of the background. Typically, the background color is the color of the lid of the scanner.

There are several applications where it is critical to correctly and accurately know the background color. These applications include single object segmentation, multiple object segmentation, and reorienting (or de-skewing) scanned objects. One problem, however, is that the background color is rarely known and must be estimated. In the above applications and many others, it is important to obtain an accurate estimate of the background color for the particular technique to work. If background color is estimated incorrectly, the entire algorithm fails.

By way of example, one application where estimating the background color is essential to the success of the technique is the detection and extraction of objects in scanned images. Such a technique is described in U.S. Ser. No. 10/354,500 by Herley entitled "System and method for automatically detecting and extracting objects in digital image data" filed on Jan. 29, 2003. This particular object detection and extraction system searches for gaps in the histograms of rows and columns of a scanned image containing multiple objects. A gap means that there are no data pixels going across that row or column of the image. These gaps are found by classifying pixels as either data pixels or background pixels and repeatedly decomposing the image into a case with a single object and a background. Once the decomposition is complete, the single object case can easily be solved. Gaps are determined by taking profiles of a histogram. A data pixel is defined as a pixel that differs by at least a threshold from the background color. In order to correctly find the gaps, the background color needs to be accurately estimated.

One way to estimate background color is to take a global histogram and find the color having the most pixels and call that color the background color. However, there are certain instances when this approach does not work. For example, suppose that the scanner background is black and the user places pictures containing a lot of white (such as photographs from a ski trip) such that they take up most of the scanning bed. In this case, there will a great deal more white pixels than black pixels, and this approach will select white as the background color. Thus, although this approach is simple and often works, there are cases where it fails to correctly estimate the background color.

For the above object detection and extraction system, another way to estimate the background color is to take a global histogram and try two or three different colors representing the most frequently-occurring color, second most frequently-occurring color, and third most frequently-occurring color, and so forth. Each color then is used in the detection and extraction process to determine which works best. However, the problem with this approach is that it is wasteful in both time and computational expense. Therefore, what is needed is an accurate technique for estimating background color in a scanned image.

SUMMARY OF THE INVENTION

The invention disclosed herein includes a background color estimation system and method that quickly and accurately estimates a background color of a scanned image. The system and method computes a frequency distribution (such as a histogram) for each line of pixels in the image (such as rows and columns) and determines a color that occurs most frequently. If that color occurs almost as many times as there are pixels in the line, then it is designated a candidate for the background color. The most common candidate color is designated as the estimated background color.

One added benefit of the background color estimation system and method disclosed herein is that a variance also is determined. This variance can be used to determine a threshold for other image processing techniques used on the scanned image. In particular, the variance is especially well suited to help calculate the threshold in the object detection and extraction technique discussed above. This threshold is important. If the threshold is incorrectly selected, this will adversely affect the technique. For example, if the selected threshold is too wide, then data pixels close to the color of the background will incorrectly be classified as background pixels. It has been previously difficult to choose a threshold for this technique and typically the threshold is selected independently of the image being scanned. However, the background color estimation system and method both simplifies and improves the selection of the threshold.

The background color estimation method includes generating a list of candidate background colors in the scanned image. From this list, the most common candidate color is found and designated as the estimated background color. Candidate colors are extracted from the scanned image by first determining a coordinate system to use on the scanned image. Generally, the coordinate system will have axes that may or may not be orthogonal. Pixels within the scanned image are examined by scanning along axis scan lines. These axis scan lines are along each axis in a straight line. For example, in an orthogonal Cartesian coordinate system, the axis scan lines are rows and columns of the image.

Frequency distributions (such as histograms) are generated for each of the axis scan lines. The frequency distributions determine the frequency with which each pixel color occurs along the axis scan line. In a preferred embodiment, the frequency distribution is a histogram. The most common pixel color is estimated for each frequency distribution and compared to a frequency threshold. If a pixel frequency value is greater than the frequency threshold, the most common pixel color is designated a candidate background color. A candidate background color list is populated with these candidate background colors. The list is analyzed, and the most common candidate background color in the list is designated as the estimated background color. In addition, the variance associated with the estimated background color is determined from the frequency distribution.

The background color estimation system utilizes the above-describe method to accurately estimate a background color and provide an associated variance. The system includes a candidate color extractor, for extracting candidate background colors from a scanned image, a candidate color list that includes candidate background colors extracted by the candidate color extractor, and a candidate color frequency module that examines the candidate color list and designates the most common candidate color in the list as the estimated background color. The candidate color extractor further includes an optional color component separator that divides the scanned image into a plurality of color components or planes. For each color plane, an estimated background color is found such that the result is an estimated background color vector.

The candidate color extractor further includes a coordinate system selector that selects a coordinate system to be used on the scanned image. Moreover, the candidate color extractor includes a coordinate scanning module, for scanning the scanned image along axis scan lines, and a frequency distribution generator, for computing a frequency distribution (such as a histogram) of pixel colors along each axis scan line. The candidate color extractor also includes a frequency distribution analyzer that analyzes the frequency distribution to extract properties of the frequency distribution. These properties include a color for each pixel in the axis scan line, a frequency value for each pixel color, and the variance of each pixel color.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current algorithms for detecting and segmenting objects in scanned images require an accurate estimate of the background color. Typically, the background color is the color of the scanner lid that covers the scanner platen. In addition, the scanned image usually contains rectangular objects that need to be separated out of the scanned image into their own image files. Accurate detection and segmentation of these objects in the scanned image requires a robust and efficient method of distinguishing data pixels (or those pixels that lie within the objects) from background pixels.

Approaches to estimating the background color often hinge on finding a dominant color (or at least a local peak) in a histogram of the image. This works well for many types of scanned images, especially where the background color accounts for a majority or a large fraction of the total number of pixels in the image. However, these types of approaches often can break down when the number of background pixels is only a small fraction of the total number of pixels. Moreover, these approaches generally fail when many pixels that are located inside the objects are similar in color to the background pixels.

The background color estimation system and method described herein exploits the fact that there are typically long runs of background pixels in the scanned image. These long runs of background pixels can be identified by scanning the scanned image along the axes of an imaginary coordinate system overlayed on the scanned image. A frequency distribution (such as a histogram) of pixel colors along each scan is generated and analyzed. From these frequency distributions, a list of candidate background colors can be extracted and a background color estimated. In addition, the variance associated with the estimated background color can be used advantageously in certain object detection and extraction techniques.

II. General Overview

Figure 1:
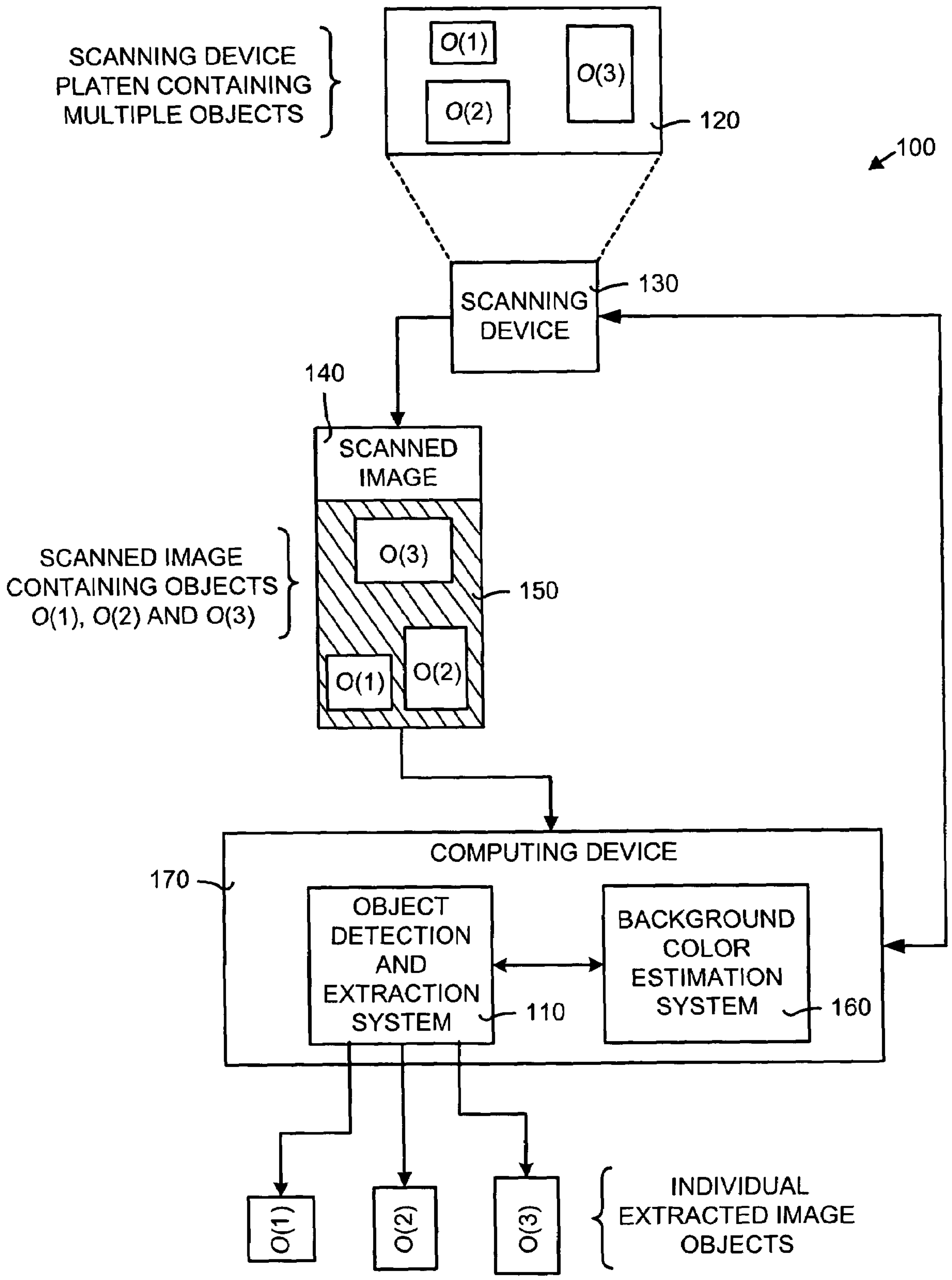
FIG. 1 is a block diagram illustrating an exemplary implementation of the background color estimation system and method disclosed herein incorporated into an image processing system.

FIG. 1 is a block diagram illustrating an exemplary implementation of the background color estimation system and method disclosed herein incorporated into an image processing system. It should be noted that FIG. 1 is merely one of several ways in which the background color estimation system and method may implemented and used. In the exemplary implementation shown in FIG. 1, the background color estimation system and method is shown implemented into an image processing system 100 that includes an object detection and extraction system 110 described in U.S. Ser. No. 10/354,500 by Herley entitled "System and method for automatically detecting and extracting objects in digital image data" filed on Jan. 29, 2003.

In general, digital image data is processed by the object detection and extraction system 110 to determine the number of objects and the size, orientation and position of each object contained in the digital image data. The system 110 achieves this by determining the boundaries of each object and automatically segregating the objects into separate image objects. This spares the user the time and effort of performing manual segregation of each object.

More specifically, as shown in FIG. 1, a user places multiple objects (such as photographs or receipts), O(1), O(2) and O(3), on a platen 120 of a scanning device 130 (such as a flatbed scanner). The dashed lines shown in FIG. 1 are to represent that the platen 120 is contained on the scanning device 130. The user then scans the objects positioned on the platen 120 and a scanned image 140 is obtained. The scanned image 140 is a single digital image containing each of the objects (O(1), O(2) and O(3)) as well as background data 150. The background data, which is shown in FIG. 1 by the hatched lines, typically represents color of a lid (not shown) of the scanning device 130. This lid typically covers the platen 120 during the scanning process.

In order for the object detection and extraction system 110 to accurately detect and extract the objects (O(1), O(2) and O(3)) from the scanned image 140, the color of the background must be accurately estimated. A background color estimation system 160 as disclosed herein is used to accurately estimate the background color. The system 160 makes uses of the fact that the object detection and extraction system 110 simplifies the detection and extraction process by using rows or columns that have a majority of background pixels.

Because only those scanned images that contain such rows or columns will be successfully simplified by the object detection and extraction system 110, the system 160 can exclude from consideration as a background color any color that does not contain the dominant number of pixels in at least several rows and columns. In addition to providing an accurate estimate of the background color, the background color estimation system 160 also provides a variance associated with the background color. This variance is quite useful in determining which threshold value to use in the object detection and extraction system 110.

Both the object detection and extraction system 110 and the background color estimation system 160 are located on a computing device 170 (although not necessarily on the same computing device). The computing environment in which the background color estimation system 160 operates will now be discussed.

III. Exemplary Operating Environment

The background color estimation system 160 and method disclosed herein are designed to operate in a computing environment. The following discussion is intended to provide a brief, general description of a suitable computing environment in which the background color estimation system and method may be implemented.

Figure 2:
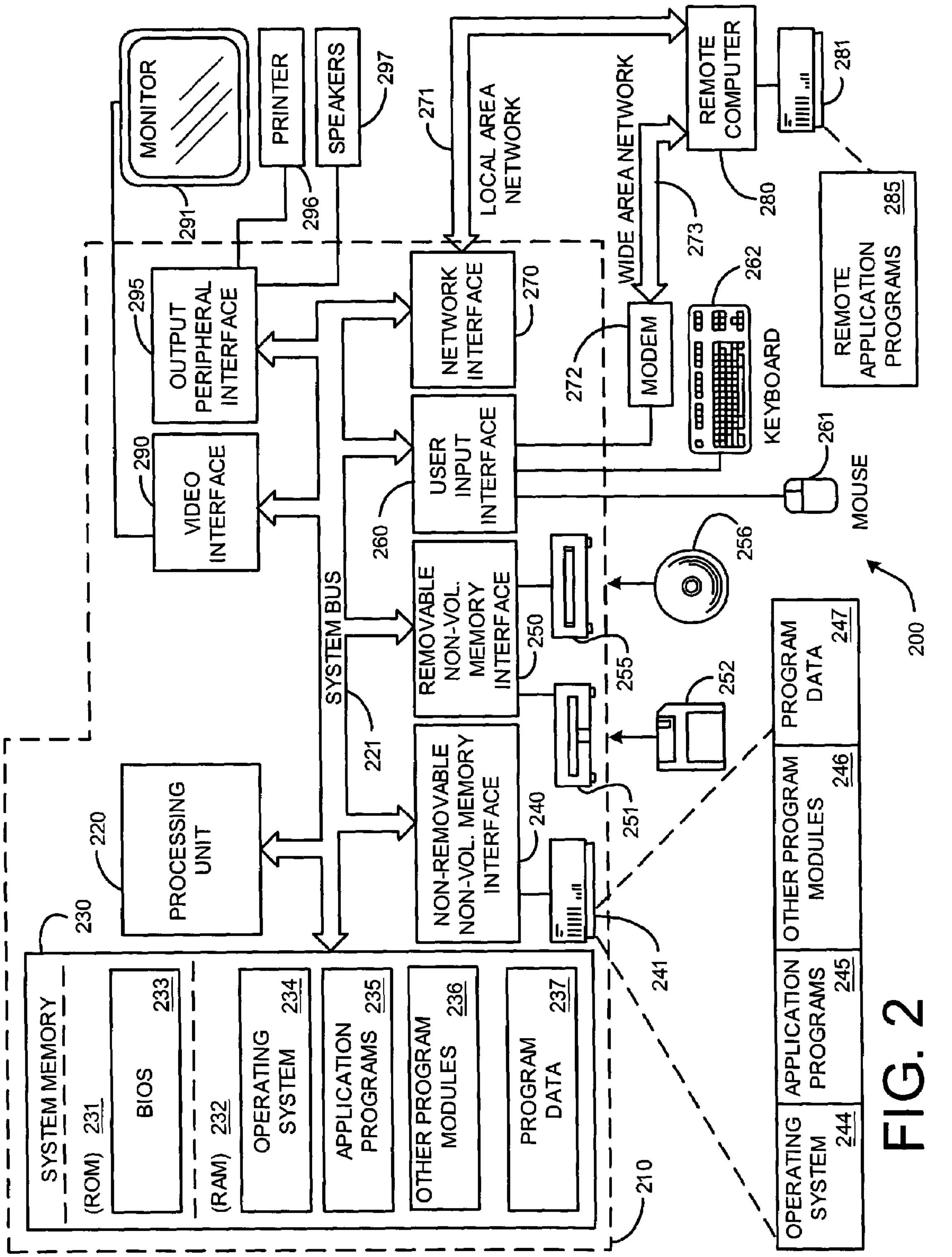
FIG. 2 illustrates an example of a suitable computing system environment in which the background color estimation system and method shown in FIG. 1 may be implemented.

FIG. 2 illustrates an example of a suitable computing system environment in which the background color estimation system 160 and method shown in FIG. 1 may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The background color estimation system and method is operational with numerous other general purpose or special purpose computing system environments or configurations. Examples of well known computing systems, environments, and/or configurations that may be suitable for use with the background color estimation system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The background color estimation system and method may be described in the general context of computer-executable instructions, such as program modules, being executed by a computer. Generally, program modules include routines, programs, objects, components, data structures, etc., that perform particular tasks or implement particular abstract data types. The background color estimation system and method may also be practiced in distributed computing environments where tasks are performed by remote processing devices that are linked through a communications network. -In a distributed computing environment, program modules may be located in both local and remote computer storage media including memory storage devices. With reference to FIG. 2, an exemplary system for implementing the background color estimation system and method includes a general-purpose computing device in the form of a computer 210 (the computing device 170 shown in FIG. 1 is a specific embodiment of the computer 210).

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. System Component

The background color estimation system 160 includes a number of program modules that allow the system 160 to accurately estimate the background color of a scanned image. In addition, the system 160 provides a variance of the background color that can be useful in determining a threshold in several object detection and segregation techniques. These program modules now will be discussed.

Figure 3:
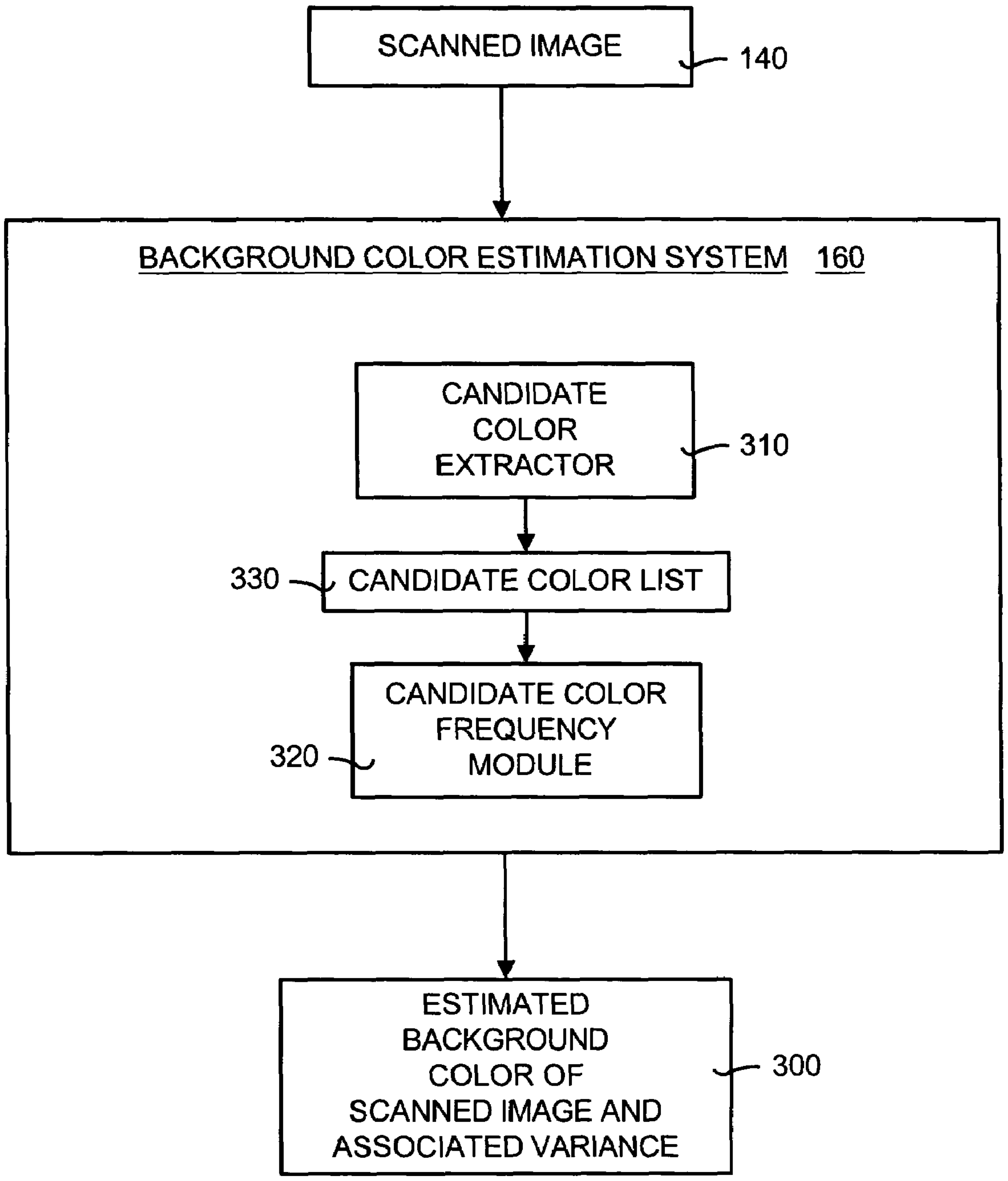
FIG. 3 is a block diagram illustrating the details of the background color estimation system shown in FIG. 1.

FIG. 3 is a block diagram illustrating the details of the background color estimation system 160 shown in FIG. 1. As shown in FIG. 3, in general the background color estimation system 160 inputs the scanned image 140 and outputs an estimated background color of the scanned image along with an associated variance 300. The background color estimation system 160 includes a candidate color extractor 310 and a candidate color frequency module 320. In general, the candidate color extractor 310 analyzes the scanned image 140 and extracts pixel colors that are candidates for the background color. As explained in detail below, these candidate colors are pixel colors that are the predominant color in a frequency distribution (such as a histogram). The candidate color extractor 310 complies and outputs a list of the candidate colors 330.

The candidate color frequency module 320 examines the candidate color list 330 and determines the most common candidate color (or colors). The most common color is designated as an estimated background color. In addition, the candidate color frequency module 320 outputs the variance of the estimated background color as determined by the candidate color extractor 310. It is possible that the candidate color extractor 310 may find more than one color that dominates the candidate color list 330. In this situation, each of the dominant colors may be designated as the estimated background color and each of the estimated colors could be tried in the object detection and segmentation system (or any other system needing to know the background color). However, in the vast majority of cases only a single color will dominate the candidate color list 330.

Figure 4:
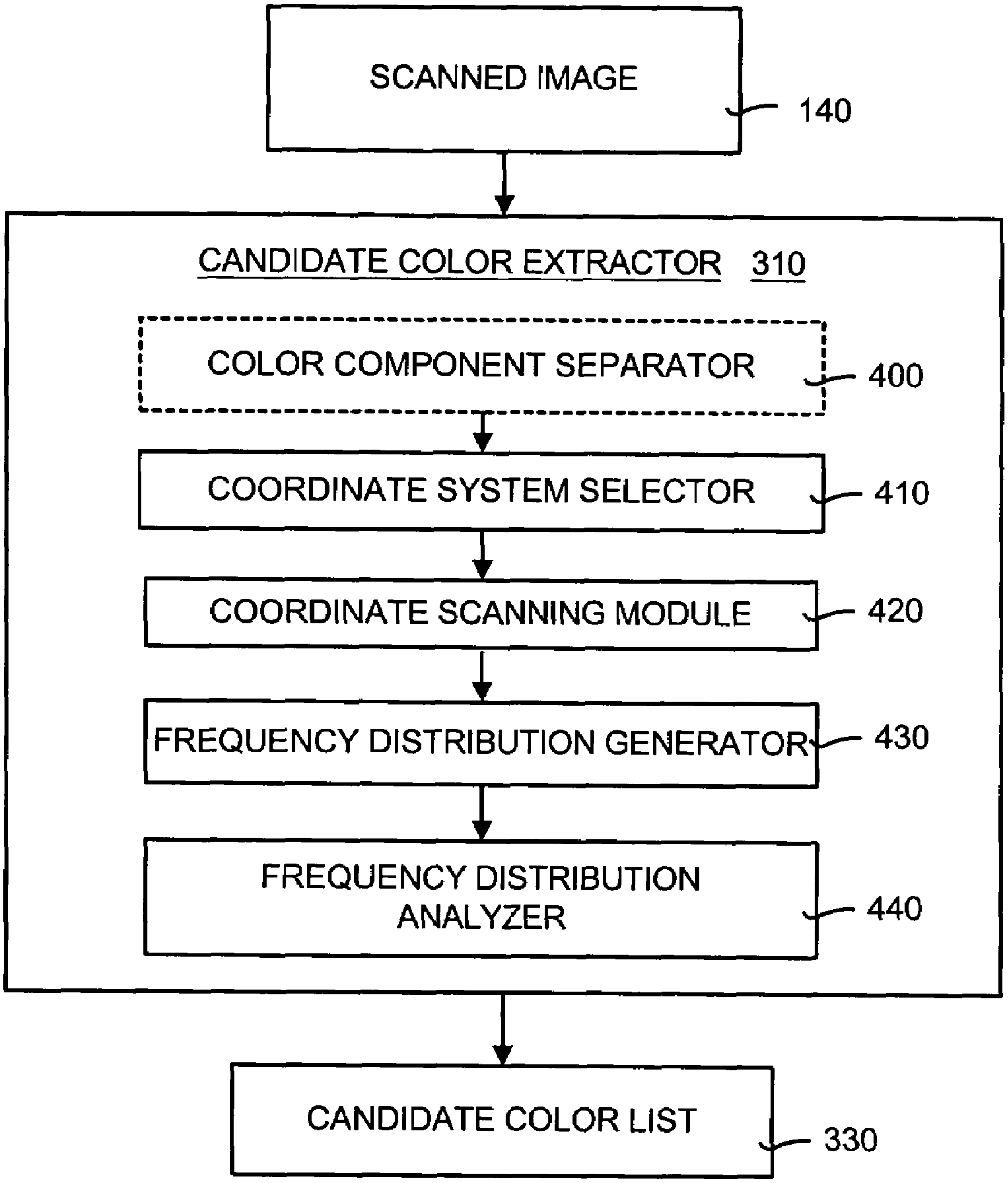
FIG. 4 is a block diagram illustrating the details of the candidate color extractor shown in FIG. 3.

FIG. 4 is a block diagram illustrating the details of the candidate color extractor shown in FIG. 3. In general, the candidate color extractor 310 inputs the scanned image 140 and outputs the candidate color list 330 containing candidate background colors extracted from the scanned image 140. The components of the candidate color extractor 310 include an optional color component separator 400, a coordinate system selector 410, a coordinate scanning module 420, a frequency distribution generator 430, and a frequency distribution analyzer 440. Each of these components of the candidate color extractor 310 will now be discussed in detail.

The color component separator 400 is an optional component, as shown in FIG. 4 by the dashed lines. The color component separator 400 is used when the scanned image 140 is a color image. The color component separator 400 separates a color scanned image into color components or planes. For example, the color scanned image may be separated into its RBG (Red, Blue, Green) color planes. Alternatively, the scanned image 140 may be a gray scale image, in which case the color component separator 400 typically is not used.

The coordinate system selector 410 is used to select a coordinate system that will be overlayed on the scanned image 140. This overlay is imaginary, and is used to set forth the manner in which the coordinate scanning module 420 discussed below) will examine each pixel in the scanned image 140. The coordinate system is used to dictate the directions (such as rows and columns) in which the scanned image will be analyzed. Preferably, the coordinate system is a Cartesian coordinate system having orthogonal, straight axes (such as vertical and horizontal axes) such that the pixels of the scanned image 140 are arranged in rows and columns. Alternatively, the coordinate system contain straight line axes that are not necessarily orthogonal to each other.

The coordinate scanning module 420 scans each axis of the coordinate system such that each pixel the scanned image 140 is examined. This is called scanning along an axis scan line. For example, if the coordinate system is a Cartesian coordinate system having vertical and horizontal axes overlayed on the scanned image 140, the coordinate scanning module 420 scans along each row and each column of the scanned image 420. It should be noted that the term "scan" as used in connection with the coordinate scanning module 420 is different from the scanning that created the scanned image 140. The scanned image was created by a scanner, such as the scanning device 130 shown in FIG. 1. As used in connection with the coordinate scanning module 420, the term "scan" means that each pixel along each direction or axis scan line (such the rows or columns) of an image is examined in sequential order to determine certain properties of the pixels (such as pixel color).

The frequency distribution generator 430 is used to compute a frequency distribution (such as a histogram) of pixel colors along each axis scan line in scanned image 140. For example, if the scanned image has rows and columns, a frequency distribution of pixel colors is generated for the pixels in each row and each column. The frequency distribution is an estimation of the color of each pixel and how many pixels of a particular color are present in the row or column. A common technique for representing frequency distribution is a histogram. It should be noted that, as used in this specification, the term "frequency distribution" is different from a fast Fourier transform (FFT), for example.

The frequency distribution analyzer 440 analyzes the frequency distribution generated by the frequency distribution generator 430 to extract certain properties. These properties include the color of each pixel in the row or column (or along some other axis scan line), a frequency value for each pixel color. The frequency value corresponds to each pixel color present and represents the quantity of pixels that are a particular pixel color. A preferred analysis of the frequency distribution is discussed in detail in the working example below. Based on the analysis of the frequency distribution, candidate background colors are extracted from the scanned image 140 and used to populate the candidate color list 330.

V. Operational Overview

Figure 5:
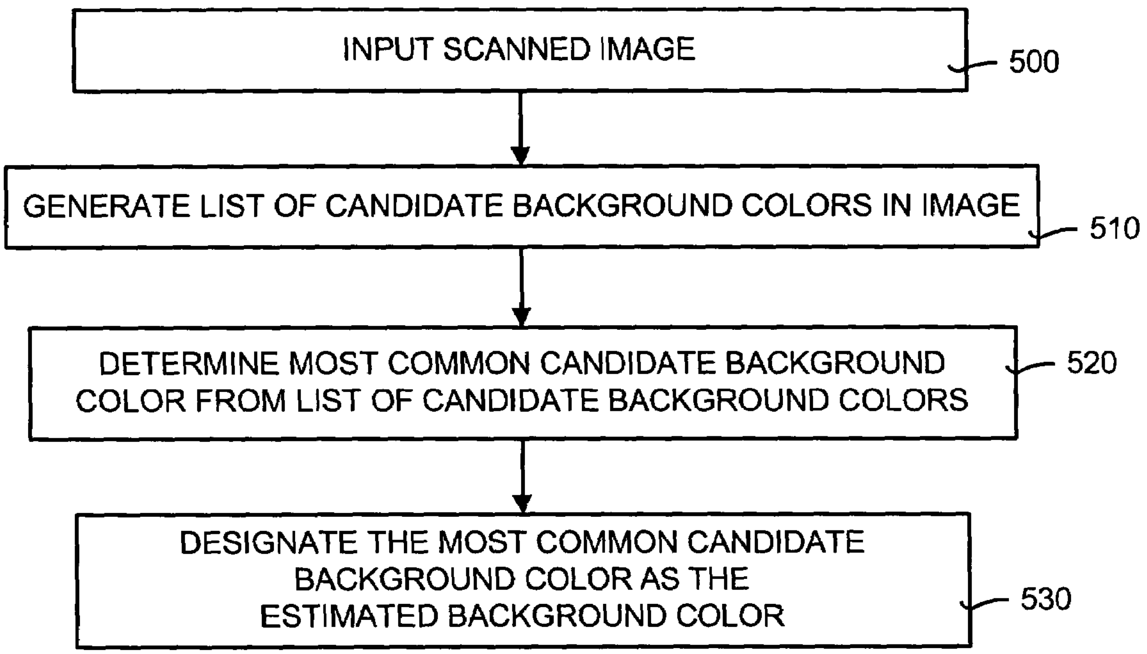
FIG. 5 is a general flow diagram illustrating the general operation of the background color estimation method of the background color estimation system shown in FIGS. 1 and 3.

The background color estimation system 160 disclosed herein uses the background color estimation method to provide accurate and efficient estimation of the background color of the scanned image 140. FIG. 5 is a general flow diagram illustrating the general operation of the background color estimation method of the background color estimation system 160 shown in FIGS. 1 and 3. The method begins by inputting a scanned image containing digital image data (box 500). Next, a list of candidate background colors within the image is generated (box 510). This list contains pixel colors contained within the image that are candidates for the background color of the image. A determination then is made as to the most common candidate background present in the candidate background color list (box 520). Finally, the most common candidate background color found in the list is designated as the estimated background color (box 530).

Figure 6:
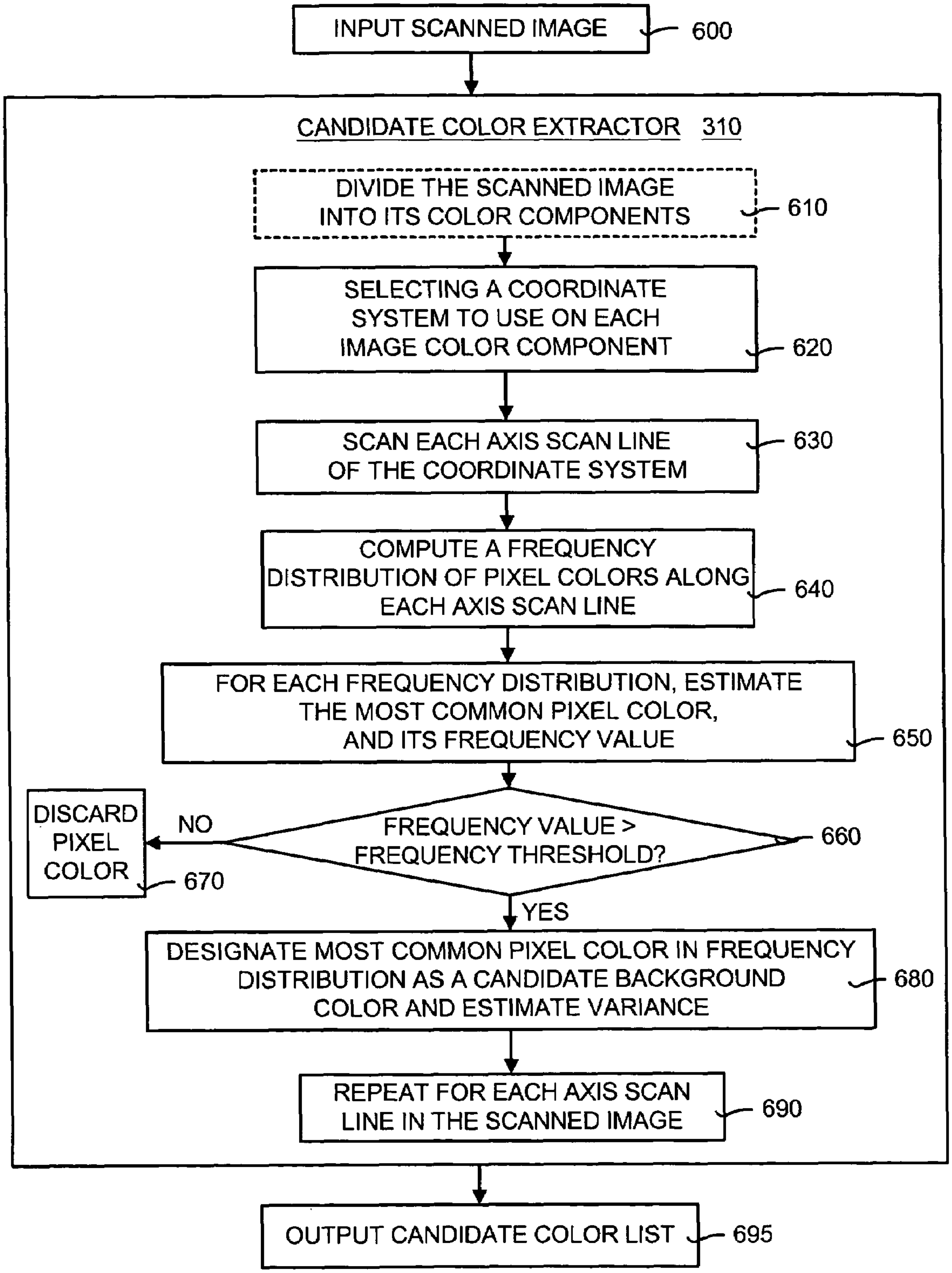
FIG. 6 is a detailed flow diagram illustrating in further detail the operation of the background color estimation method shown in FIG. 5.

FIG. 6 is a detailed flow diagram illustrating in further detail the operation of the background color estimation method shown in FIG. 5. The method begins by inputting the scanned image (box 600). An optional technique, as shown by the dashed lines, is to divide the scanned image into its color components (box 610). If the scanned image is a color image, this technique is preferred. Next, a coordinate system is selected that will be used to analyze the image (box 620). If the image has been divided into its color components, then the coordinate system is used for each of the color components. It is possible that different coordinate systems could be used on different color components.

The method then scans each axis scan line of the coordinate system in the image (box 630). Along each axis scan line, a frequency distribution (such as a histogram) of pixel colors is computed (box 640). For each frequency distribution, an estimate is made of the most common pixel color and its frequency value (box 650). A determination is made whether the frequency value is greater than a frequency threshold (box 660). Typically, this frequency threshold is set to approximately 90% of all pixels in the frequency distribution (i.e., along the axis scan line). If the frequency value is not greater than the frequency threshold, the pixel color is discarded and not considered further (box 670). If the frequency value is greater than the frequency threshold, the most common pixel color in the frequency distribution is designated as a candidate background color, and the variance of the pixel colors in that line are estimated (box 680). This process is repeated for each axis scan line (such as rows and columns) in the scanned image (box 690). Each of the candidate background colors is complied in a list of candidate background colors that is output (box 695).

It should be understood that when calculating the histogram of a line of an image it is unlikely that a majority of pixels will fall in a single bin, even when a single color dominates. More likely is that the pixels of a single color may be spread among several bins. To determine whether a single color dominates it is advisable to use a coarse binned histogram (such as bins of width 16 for pixels in the range 0 to 255). Then, count pixels can be counted as being of the same color if they are in any of three neighboring bins.

VI. Working Example

In order to more fully understand the background color estimation system and method disclosed herein, the operational details of an exemplary working example are presented. It should be noted that this working example is only one way in which the background color estimation system and method may be implemented. In this working example, a scanned image containing rectangular objects is processed using the background color estimation system and method preparatory to processing by the object detection and extraction system 110 shown in FIG. 1.

The object detection and extraction system 110 generally detects and segregates objects in a scanned image by classifying each pixel in the image as a data pixel (on an object in the image) or a background pixel (not on an object). If the background color is not estimated accurately, the pixel classification can become erroneous and the objects in the image will not be detected and properly segregated and extracted. It is equally important to choose a threshold T so that the number of misclassified pixels are small. For example, if an image has a background color that is a saturated white (e.g., gray level 255), the variance typically is quite small. This means that a smaller or tighter threshold can be used than might be possible if the variance was larger.

Figure 7:
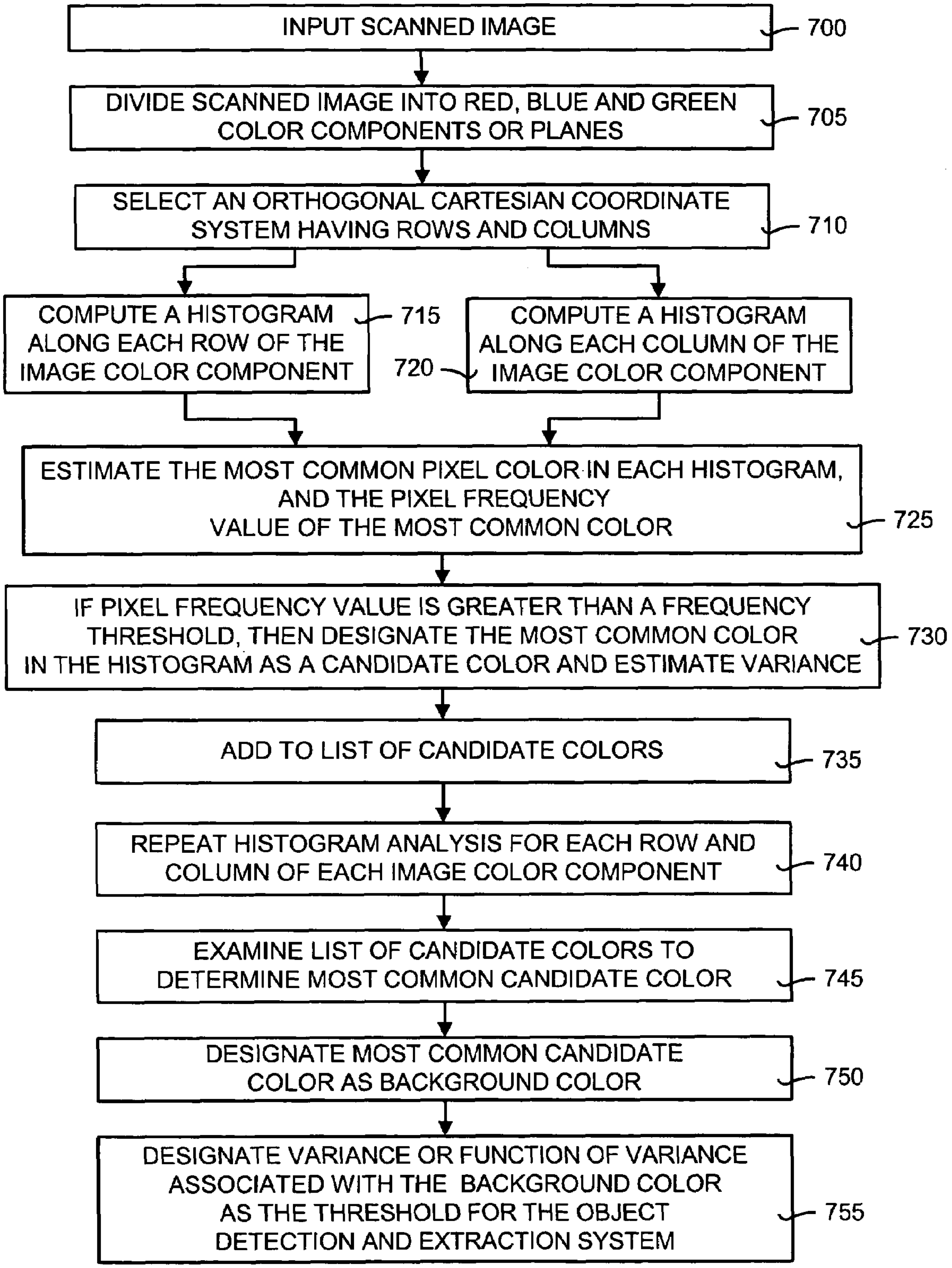
FIG. 7 is a detailed flow diagram illustrating a working example of the background color estimation system and method.

FIG. 7 is a detailed flow diagram illustrating a working example of the background color estimation system and method. Initially, a scanned image is input (box 700). In this working example, the scanned image contained objects that a user desired to detect and segregate out of the image. Next, the scanned image was divided into its red, blue and green color planes (box 705). A Cartesian coordinate system having orthogonal vertical and horizontal axes was selected (box 710). This meant that the pixels in the scanned image were arranged in horizontal rows and vertical columns.

Each color plane of the scanned image was processed using the following technique. First, a histogram of pixel colors was computed for each row of the image color plane (box 715) and for each column of the image color plane (box 720). Each of these histograms was examined to determine the most common pixel color in the histogram (box 725). In addition, the pixel frequency value of each pixel color in the histogram and the variance of each pixel color was computed. The pixel frequency value and the variance are discussed below in regard to FIG. 8.

The pixel frequency value then was compared to a frequency threshold. In this working example, the frequency threshold was 0.9, or 90% of all pixels in the histogram. If the pixel frequency value was greater than the frequency threshold, then the most common pixel color in the histogram was designated as a candidate background color (box 730). Each candidate color was added to a list of candidate background colors (box 735). This histogram analysis was repeated for each row and column in each color plane of the scanned image (box 740).

Once the candidate background color list was generated, it was examined to determine a most common pixel color in the list (box 745). The most common candidate background color then was designated as the estimated background color (box 750). In addition, the variance associated with the estimated background color was used as the threshold in the object detection and extraction system 110.

Figure 8:
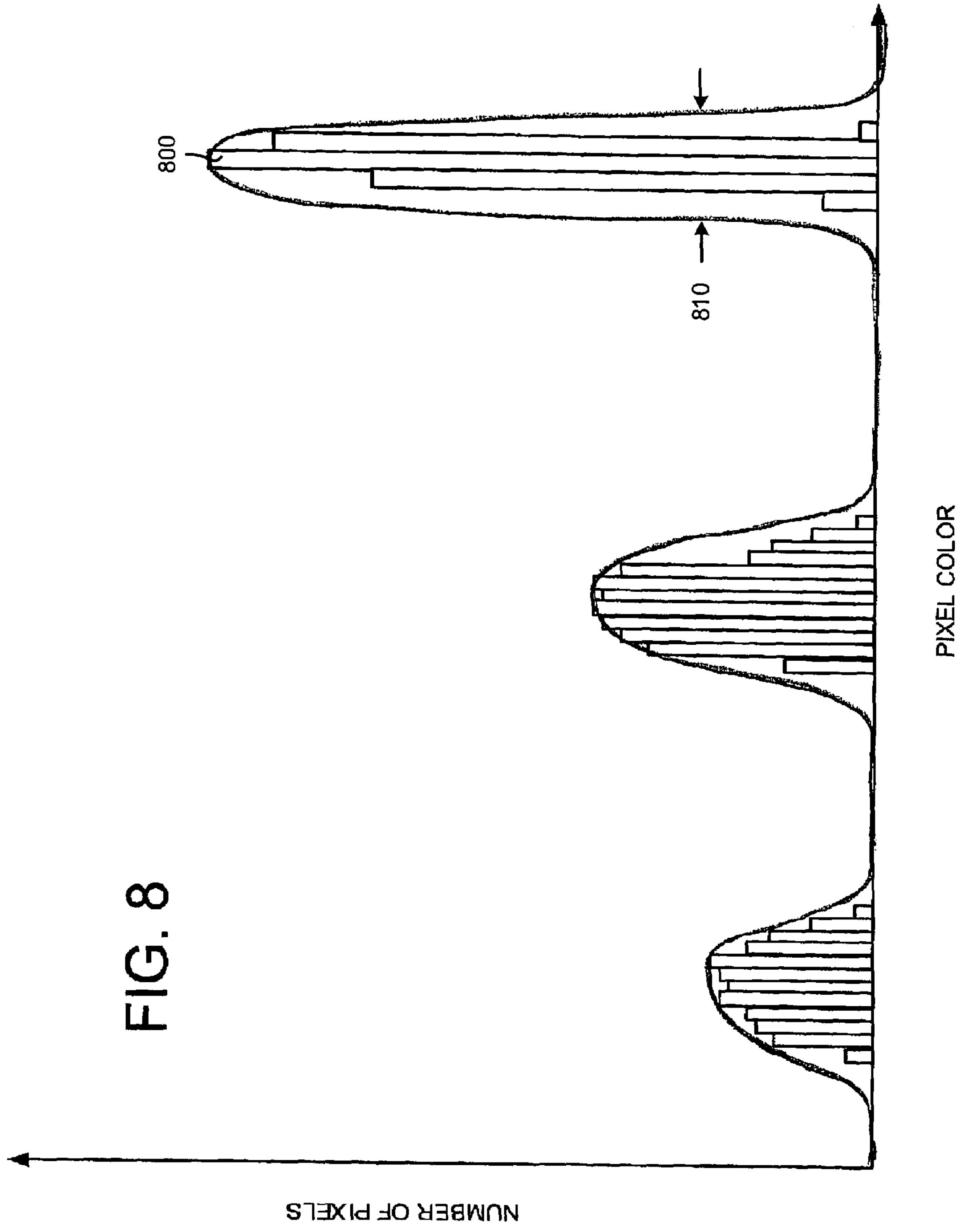
FIG. 8 is a simplified diagram of the analysis performed on a histogram for a row of pixels, and is presented for illustrative purposes only.

In order to more fully understand the histogram analysis described above, the following discussion is offered. In particular, FIG. 8 is a simplified diagram of the analysis performed on a histogram for a row of pixels, and is presented for illustrative purposes only. As shown in FIG. 8, each bar represents a pixel frequency value, or the number of pixels of a certain pixel color. For each histogram, a most common pixel color is estimated. In FIG. 8, the most common pixel color is represented by the bar 800. In this case, the pixel color represented by the bar 800 would become a candidate background color if the frequency pixel value (or number of pixels of the associated color) was greater than the frequency threshold.

The variance of he most common pixel color is shown in FIG. 8 as the approximate width of the curve surrounding the color. This variance 810 is shown in FIG. 8. The greater the width of the curve, the greater the variance. For example, suppose the scanner background is a saturated white. The histogram of the empty scanner will contain a high number of pixels having a value of 255, much less at 254, fewer at 253, a couple at 252 and none at 251. What this means is that the curve is quite narrow and a variance will be quite narrow (such as equal to 2). On the other hand, if the scanner background is gray, the curve is not as narrow and the threshold will probably be much wider (such as equal to 8). Pixels having color that is substantially different from the dominant color on the line can be omitted in calculation of the variance.

Preferably, the variance is used as the threshold for the object detection and extraction system 110, and the threshold is related to the variance or standard deviation. By correctly choosing a threshold, the situation can be avoided where background pixels are classified as data pixels and the processing suffers.

Pseudo code for the working example, where the image is called Im(i,j), is as follows:

```
    getBackground(Im){
        for i = 0, #rows−1{
            [maxClr, maxVal] = histogram(Im(i,0;jmax));
            if (maxVal > 0.9* jmax)
                candClr[cnt] = maxClr;
                candVar[cnt++] = variance(Im(i,0;jmax));}
        for j = 0, #cols−1{
            [maxClr, maxVal] = histogram(Im(0;imax,j));
            if (maxVal > 0.9* imax)
                candClr[cnt] = maxClr;
                candVar[cnt++] = variance(Im(0;imax,j))}
        [B,T] = mostCommonClr(candClr);
    }
```

where [maxClr, maxVal]=histogram(Im); returns the most common color in the image Im as maxClr, and the number of pixels of that color as maxVal. Furthermore, mostCommonClr(candClr) returns the most frequently occurring color in the list of candidate colors, and T is a threshold that is proportional to the variance. This process essentially isolates rows and columns having only background pixels such that the background color and variance can be estimated with a great deal of confidence and accuracy.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for estimating a background color of a scanned image, comprising:

generating a frequency distribution of pixel colors for each axis scan line in a first direction and for each axis scan line in a second direction of the scanned image, wherein each axis scan line in the first direction and each axis scan line in the second direction are not orthogonal to each other;

compiling a list of candidate colors based on the frequency distributions;

determining a most common candidate color from the list of candidate colors; and designating the most common candidate color as the estimated background color.

2. The computer-implemented method of claim 1, wherein each frequency distribution is a histogram.

3. The computer-implemented method of claim 1, wherein each axis scan line in the first direction and each axis scan line in the second direction is at least one of: (a) a row of pixels in the scanned image; (b) a column of pixels in the scanned image.

4. The computer-implemented method of claim 1, further comprising determining a most common pixel color for each of the frequency distributions.

5. The computer-implemented method of claim 4, further comprising designating the most common pixel color of each frequency distribution as a candidate color if a frequency value of the most common pixel color is approximately greater than a frequency threshold.

6. The computer-implemented method of claim 5, wherein the frequency threshold is approximately 0.9 or 90%.

7. The computer-implemented method of claim 1, further comprising determining a variance of the estimated background color.

8. The computer-implemented method of claim 1, wherein generating a frequency distribution of pixel colors further comprises computing a histogram of pixel colors for each row and column in the scanned image.

9. The computer-implemented method of claim 8, further comprising obtaining a variance of the estimated background color from its histogram and using the variance in another image processing technique used on the scanned image.

10. The computer-implemented method of claim 1, further comprising dividing the scanned image into separate color components and estimating a background color for each of the color components.

11. A computer-readable medium having computer-executable instructions for performing the computer-implemented method recited in claim 1.

12. A background color estimation system for estimating a background color of a scanned image, comprising:

a first axis scan line in a first direction and a second axis scan line in a second direction, the first axis scan line and the second axis scan line being non-orthogonal to each other;

a candidate color extractor that extracts candidate background colors from the scanned image by computing a frequency distribution of pixel colors for the first axis scan line and the second axis scan line of the scanned image;

a candidate color list that is populated with candidate background colors extracted by the candidate color extractor; and a candidate color frequency module that examines the candidate color list and designates the most common candidate color in the list as the estimated background color.

13. The background color estimation system as set forth in claim 12, wherein the candidate color extractor further comprises a color component separator that separates the scanned image into color components or planes.

14. The background color estimation system as set forth in claim 12, wherein the candidate color extractor further comprises a coordinate system selector that selects a coordinate system to be used on the scanned image.

15. The background color estimation system as set forth in claim 14, further comprising a coordinate scanning module that scans the scanned image along the first and second axis scan lines of the coordinate system such that each pixel in the scanned image is examined.

16. The background color estimation system as set forth in claim 12, wherein the frequency distribution is a histogram.

17. The background color estimation system as set forth in claim 12, further comprising a frequency distribution analyzer that analyzes the frequency distribution generated by the frequency distribution generator to extract certain properties.

18. The background color estimation system as set forth in claim 17, wherein the properties include at least one of: (a) a color of each pixel along a row or column of the scanned image; (b) a frequency value for each pixel color; (c) a variance of each pixel color.

* * * * *